US008601127B2

(12) United States Patent
Lim et al.

(10) Patent No.: US 8,601,127 B2
(45) Date of Patent: Dec. 3, 2013

(54) METHOD FOR SELECTIVE SERVICE UPDATES FOR COMMUNICATION NETWORKS

(75) Inventors: Chun Keong Benjamin Lim, Singapore (SG); Sampath Swaroop Kumar, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 711 days.

(21) Appl. No.: 12/159,889

(22) PCT Filed: Jan. 31, 2007

(86) PCT No.: PCT/JP2007/052066
§ 371 (c)(1),
(2), (4) Date: Dec. 17, 2008

(87) PCT Pub. No.: WO2007/089023
PCT Pub. Date: Aug. 9, 2007

(65) Prior Publication Data
US 2009/0210532 A1    Aug. 20, 2009

Related U.S. Application Data (60) Provisional application No. 60/792,630, filed on Apr. 18, 2006.

(30) Foreign Application Priority Data

Jan. 31, 2006  (WO) ................. PCT/JP2006/301945

(51) Int. Cl.
*G06F 15/16*    (2006.01)
(52) U.S. Cl.
USPC ........... 709/226; 709/203; 709/211; 709/229; 709/248

(58) Field of Classification Search
USPC ......... 709/203, 211, 217–219, 226, 229, 248, 709/249; 726/12; 719/317; 718/104
See application file for complete search history.

(56) References Cited

U.S. PATENT DOCUMENTS 6,762,690 B1 *  7/2004  Diehl et al. ................. 340/4.41
7,103,704 B2 *  9/2006  Chatterjee ..................... 710/315
(Continued)

FOREIGN PATENT DOCUMENTS

| EP | 1058422 A1 | 12/2000 |
| EP | 1530320 A1 | 5/2005 |
| EP | 1592179 A1 | 11/2005 |

OTHER PUBLICATIONS

Song, Alex. "PicoNet II: A Wireless Ad Hoc Network for Mobile Handheld Devices," Dept of Information Technology and Electrical Engineering, University of Queensland, Oct. 2001.*

(Continued)

*Primary Examiner* — Melvin H Pollack
(74) *Attorney, Agent, or Firm* — Seed IP Law Group PLLC (57) ABSTRACT

A method for performing selective updating procedure of service advertisements. In this method, a Master personal gateway (10*a*) chooses a Slave personal gateway (10*c*) to update from its service list (step 40). The Master personal gateway (10*a*) uses the service description stored in its service list to determine if the Slave personal gateway (10*c*) of PAN (21*c*) has the capabilities to use the service advertised (step 41). The Master personal gateway (10*a*) then forwards the service advertisement to the Slave personal gateway (10*c*) (step 42). The Slave personal gateway (10*c*) updates its service list and advertises the service within its PAN (21*c*) (step 43).

13 Claims, 7 Drawing Sheets

(56) References Cited

U.S. PATENT DOCUMENTS

| | | | |
|---|---|---|---|
| 7,158,756 B2 * | 1/2007 | Palin et al. | 455/41.2 |
| 7,181,556 B2 * | 2/2007 | Gwilt | 710/110 |
| 7,263,551 B2 * | 8/2007 | Belfiore et al. | 709/219 |
| 7,284,054 B2 * | 10/2007 | Radhakrishnan | 709/226 |
| 7,346,370 B2 * | 3/2008 | Spaur et al. | 455/556.1 |
| 7,383,347 B2 * | 6/2008 | Ebling et al. | 709/232 |
| 7,401,120 B2 * | 7/2008 | Walbeck et al. | 709/203 |
| 7,457,304 B2 * | 11/2008 | Roh et al. | 370/406 |
| 7,463,637 B2 * | 12/2008 | Bou-Diab et al. | 370/401 |
| 7,483,438 B2 * | 1/2009 | Serghi et al. | 370/401 |
| 7,487,204 B2 * | 2/2009 | Asthana et al. | 709/203 |
| 7,492,777 B2 * | 2/2009 | Ekberg et al. | 370/401 |
| 7,561,586 B2 * | 7/2009 | Wang et al. | 370/401 |
| 7,590,086 B2 * | 9/2009 | Olkkonen et al. | 370/328 |
| 7,590,684 B2 * | 9/2009 | Herrmann | 709/203 |
| 7,664,081 B2 * | 2/2010 | Luoma et al. | 370/338 |
| 7,675,912 B1 * | 3/2010 | Ward et al. | 370/392 |
| 7,720,076 B2 * | 5/2010 | Dobbins et al. | 370/395.53 |
| 7,724,764 B2 * | 5/2010 | Lifshitz et al. | 370/445 |
| 7,725,569 B2 * | 5/2010 | Brady et al. | 709/223 |
| 7,782,875 B2 * | 8/2010 | Mikkola | 370/400 |
| 7,783,771 B2 * | 8/2010 | Pantalone | 709/230 |
| 7,801,486 B2 * | 9/2010 | Barnier | 455/41.2 |
| 7,966,382 B2 * | 6/2011 | Ahluwalia et al. | 709/218 |
| 7,979,913 B2 * | 7/2011 | Jang et al. | 726/29 |
| 7,987,360 B2 * | 7/2011 | Luo et al. | 713/163 |
| 8,023,940 B2 * | 9/2011 | Lynch et al. | 455/432.2 |
| 8,060,590 B2 * | 11/2011 | Lobbert | 709/223 |
| 8,204,973 B2 * | 6/2012 | Cuervo et al. | 709/223 |
| 2003/0149794 A1 | 8/2003 | Morris et al. | |
| 2004/0087274 A1 * | 5/2004 | Ekberg et al. | 455/41.2 |
| 2004/0266439 A1 | 12/2004 | Lynch, Jr. | |
| 2005/0128958 A1 * | 6/2005 | Hamdan | 370/254 |
| 2005/0240665 A1 * | 10/2005 | Gu et al. | 709/220 |
| 2006/0187858 A1 * | 8/2006 | Kenichi et al. | 370/254 |
| 2006/0235973 A1 * | 10/2006 | McBride et al. | 709/226 |
| 2007/0118625 A1 * | 5/2007 | Min et al. | 709/221 |
| 2007/0129145 A1 * | 6/2007 | Blackburn et al. | 463/42 |
| 2010/0165947 A1 * | 7/2010 | Taniuchi et al. | 370/331 |

OTHER PUBLICATIONS

"3rd Generation Partnership Project; Technical Specification Group Services and Systems Aspects; All-IP Network (AIPN) Feasibility Study (Release 7)," Technical Report 3GPP TR 22.978 (V7.1.0), 3GPP Organizational Partners, Valbonne, France, Jun. 2005, 63 pages.

Frodigh, M., et al., "Wireless ad hoc Networking—The Art of Networking Without a Network," Ericsson Review 77(4)248-263, 2000.

Hui, P., et al., "A Peer-to-Peer Jini Architecture for Pervasive Multimedia," Proceedings of the 60th IEEE Vehicular Technology Conference (VTC2004-Fall), Los Angeles, Sep. 26-29, 2004, vol. 5, pp. 3160-3164.

Mahlknecht, S., and P. Palensky, "Linking Control Networks and Wireless Personal Area Networks," Proceedings of the 9th IEEE Conference on Emerging Technologies and Factory Automation Proceedings (ETFA2003), Lisbon, Portugal, Sep. 16-19, 2003, vol. 1, pp. 31-36.

Sundramoorthy, V., et al., "Service Discovery at Home," Proceedings of the Joint 4th Int'l Conference on Information, Communications & Signal Processing and 4th Pacific-Rim Conference on Multimedia (ICICS-PCM 2003), Singapore, Dec. 15-18, 2003, pp. 1929-1933.

UPnP™ Forum, "UPnP™ Device Architecture 1.0," Version 1.0.1, UPnP™ Implementers Corporation, Dec. 2, 2003, 76 pages.

International Search Report dated Apr. 20, 2007, issued in corresponding Application No. PCT/JP2007/052066, filed Jan. 31, 2007.

* cited by examiner

METHOD FOR SELECTIVE SERVICE UPDATES FOR COMMUNICATION NETWORKS

TECHNICAL FIELD

The present invention pertains to a method for a user's Master personal gateway to perform selective updating of service advertisements among the user's Slave personal gateways located geographically apart within the user's Personal Network.

BACKGROUND ART

[Non-patent Document 1] UPnP™ Forum, "UPnP™ Device Architecture 1.0", UPnP™ version 1.0.1, December 2003.
[Non-patent Document 2] 3rd Generation Partnership Project, "All-IP Network (AIPN) feasibility study (Release 7)", 3GPP TR 22.978 version 7.1.0, June 2005.
[Non-patent Document 3] Stefan Mahlhecht, Peter Palensky, "Linking control networks and wireless personal area networks", Emerging Technologies and Factory Automation, 2003. Proceedings. ETFA '03. Sep. 16-19, 2003, Piscataway, N.J., USA, IEEE, vol. 1, 16 Sep. 2003, pages 31-36
[US patent application 20040266439] Lynch, Jamel P. JR., Miller, Brent A. and Wesley, Ajamu A. "Systems, methods and computer program products for connecting ad hoc piconets to wide area networks", US Patent Application 2004/0266439A1, December, 2004.

This invention relates to the field of telecommunications in personal communications networks. More particularly, it concerns on how selective updating of service advertisements can be performed over the communications networks.

When a new device is added to a user's Personal Area Network (PAN), the device may choose to advertise its service(s) into the user's PAN. A typical technique for service advertisement is Universal Plug and Play (UPnP) as defined in [Non-patent Document 1]. UPnP is a distributed, open networking architecture that leverages TCP/IP and the Web technologies to enable seamless proximity networking in addition to control and data transfer among networked devices in the home, office, and public spaces. It is designed to bring easy-to-use, flexible, standards-based connectivity to ad-hoc or unmanaged networks whether in the home, in a small business, public spaces, or the Internet.

Using the UPnP discovery protocol, it allows that device to advertise its services within the user's PAN. It does this by multicasting discovery messages to a standard address and port. For the device to advertise the full extent of its capabilities, it will have to multicast a number of discovery messages corresponding to each of its embedded devices and services. Each message contains information specific to the embedded device (or service) as well as information about its enclosing device. Messages should include duration until the advertisements expire; if the device remains available, the advertisements should be re-sent with a new duration. If the device becomes unavailable, the device should explicitly cancel its advertisements, but if the device is unable to do this, the advertisements will expire on their own.

However, service advertisement in the current UPnP architecture is only suitable for a local area network environment, for example management of devices within a single home network or single office network environment. As the needs and requirements of digital living advances, a user's home network space may span across multiple homes or offices. A case in point is a user may have a house in town, a holiday home, and even some of his personal devices in his offices. The user would like to consolidate all his personal devices and define them as his personal network space. Therefore, a user is still able to retrieve the services provide by the different devices which are located geographically far apart as if they are within the locality of his home or office network. A typical example of user's Personal Network is defined in [Non-patent Document 2]. A Personal Network consists of more than one device under the control of one user providing access to the All IP Network (AIPN). These devices are interconnected by the AIPN such that the user perceives a continuous secure connection regardless of their relative locations.

In [Non-patent Document 3], the paper gives an overview on how a node is able to discover services within a particular domain or across domains. This method involves a node being able to be aware of localized services in terms of location, device capabilities or other profiles. However, this method does not specify how the node handles changes in its service profile, which is the focus of our invention.

[US patent application 20040266439] proposes a method of sending the service advertisement from an ad-hoc piconet to another ad-hoc piconet over the Wide Area Network (WAN). For this prior art, they propose the use of an application server within each ad hoc piconet. A service manifest that is located within each application server aggregates the ad hoc piconet services advertisements that are available from multiple clients within the ad hoc piconet and advertise the aggregated service list over the wide area network to other application servers. However, by broadcasting the service list over the WAN is a waste of the network resources if a particular ad hoc piconet has no need of the services advertised.

It is thus an object of the current invention to provide a method to allow a user's personal gateway to perform selective updating of service advertisements among all PAN(s) within the user's Personal Network.

DISCLOSURE OF INVENTION

The current invention provides a solution for the problem that has arisen when the user wishes to receive service advertisement(s) from the user's Personal Area Networks (PANs) which are located geographically apart. In this invention, service advertisements refer to messages relating to capability announcements including updates of new or removed capabilities. The aspect of the invention would be a method of allowing a user's Master Personal Gateway (PG) to perform selective updating of service advertisements among all Slave PGs within the user's Personal Network.

One advantage is that this allows an efficient usage of the network bandwidth as service advertisements would not be broadcasted to the all personal gateways within the user's Personal Network. A second advantage is that Slave personal gateway(s) may operate in sleep mode and only wake up to process a service advertisement. This is particularly useful for mobile devices as they have limited battery lifetime.

In one preferred embodiment of the present invention for selective updating procedure, it is provided a method of performing selective service advertisement updating procedure comprising of the following steps: a Slave Personal Gateway (PG) providing its service list to a Master Personal Gateway (PG), wherein the Slave PG service list comprises of capabilities of services that the Slave PG is interested in being updated; the Master PG storing the Slave PG service list in a Master PG service list; the Master PG receiving a service advertisement; the Master PG determining said received service advertisement is to be forwarded to a Slave PG, wherein the Master PG determining comprises of the Master PG checking from the Master PG service list if the Slave PG has requested for capabilities update of said service specified in the service advertisement; and the Master PG forwarding the service advertisement to said selected Slave PG.

In another preferred embodiment of the present invention for selective updating procedure, it is provided another method of performing selective service advertisement updating procedure comprising of the following steps: Slave PG tagging a service advertisement according to its access rules; Slave PG forwarding the tagged service advertisement to Master PG; Master PG processing the tagged service advertisement with its stored access rules; and Master PG forwarding the service advertisement to all selected Slave PGs based on its polices set within its access rule list. In this embodiment, in addition to the advantages stated in our preferred embodiment for selective updating procedure, the processing at Master PG is slightly less complex as the Master PG would only need to identify how a service advertisement is tagged and use the access rule list to determine which Slave PG should receive the service advertisement. This therefore allows the Master PG to process the service advertisement in an efficient manner.

In yet another preferred embodiment of the present invention for selective updating procedure, it is provided another policy based method of performing selective service advertisement updating procedure comprising of the following steps: Master PG identifying which Slave PG sent the service advertisement; and Master PG forwarding the service advertisement to selected Slave PGs based on its polices set within its access rule list. In this embodiment, in addition to the advantages stated in our preferred embodiment for selective updating procedure, the internal resources for a Slave PG is less demanding as only the Master PG will store the access rule list and the Slave PG will only need to forward the service advertisement to Master PG. This would therefore be very useful especially if the Slave PG is a mobile device, which has limited internal resources.

In further preferred embodiment of the present invention for selective updating procedure, it is provided a user command based method of performing selective service advertisement updating procedure comprising of the following steps: Slave PG sending the service advertisement along with a user command to Master PG; Master PG processing the user command; and Master PG forwarding the service advertisement to selected Slave PGs based on the user command. In this embodiment, in addition to the advantages stated in our preferred embodiment for selective updating procedure, it allows a user to dynamically choose which Slave PG to update. This therefore provides the user with more control on where the service update is to be sent.

In yet another preferred embodiment of the present invention for selective updating procedure, it is provided a method of performing selective service advertisement updating procedure comprising of the following steps: Master PG storing all service advertisements from Slave PGs within its data store; Slave PGs performing a service lookup to Master PC whenever it receives a service request; and Master PG forwarding the service advertisement to selected Slave PGs based on service requested.

Another aspect of the invention would be a method to allow a Master PG to handover its role to a Slave PG within the user's Personal Network, wherein the handover procedures is initiated by the Slave PG.

In one preferred embodiment of the present invention for handing over procedure, it is provided a device authentication method of performing Master PG to Slave PG handover procedure comprising of the following steps: Slave PG sending a request for handover along with it's device authentication information to Master PG based on user's request; Master PG validating the device authentication information; Master PG sending its service list to Slave PG after authenticating it; Slave PG storing the Master PG service list; and Slave PG sending an acknowledgment to Master PG to signal the completion of the handover procedure. In this embodiment, it allows the user to dynamically switch the roles of a PG thereby allowing for a more user specific level of control of the user's Personal Network.

In another preferred embodiment of the present invention for handing over procedure, it is provided an additional method for user authentication of performing Master PG to Slave PC handover procedure comprising of the following steps; Slave PG sending a request for handover along with is device authentication information to Master PG based on user's request; Master PG validating the device authentication information; Master PG sending a challenge to Slave PG; Slave PG sending a password to Master PG; Master sending its service list to Salve PG after validating the password; Slave PG storing the Master PG service list; and Slave PG sending an acknowledgment to Master PG to signal the completion of the handover procedure. In this embodiment of handing over procedure, in addition to the advantages stated in our preferred embodiment, user level security is enforced within the Personal Network. If the user loses PG, this therefore would minimize the risk of an intruder using the lost PG to take control of Personal Network.

In yet another preferred embodiment of the present invention for handing over procedure, it is provided a rule based method of performing Master PG to Slave PG handover procedure comprising of the following steps: Slave PG determines from its handover rule list if a handover procedure is required; Slave PG sending a request for handover along with it's device authentication information to Master PG; Master PG validating the device authentication information; Master PG determining if a user authentication is required for the handover procedure; Master PG sending its service list to Salve PG; Slave PG storing the Master PG service list; and Slave PG sending an acknowledgment to Master PG to signal the completion of the handover procedure. In this embodiment of handing over procedure, in addition to the advantages stated in our preferred embodiment, it allows a simple and automatic handover procedure to be executed without having the user to initiate the handover procedure.

Another aspect of the invention would be a method to allow a Master PG to handover its role to the Slave PG within the user's Personal Network by performing a takeover procedure, wherein the takeover procedure is initiated by the Master PG.

In a preferred embodiment of the present invention for taking over procedure, it is provided a method of performing Master PG to Slave PG takeover procedure comprising of the following steps:

Master PG sends a request for a takeover procedure along with its device authentication information to Slave PG; Slave PG validating the Master PG device authentication information and informs user of such takeover procedure; user initiates takeover procedure; Slave PG sending over an acknowledgement for the takeover procedure to proceed; Master PG sending its service list to Salve PG; Slave PG storing Master PG service list; and Slave PG sending an acknowledgment to Master PG to signal the completion of the takeover procedure.

In yet another preferred embodiment of the present invention for taking over procedure, it is provided a redirection method of performing Master PG to Slave PG takeover procedure comprising of the following steps: Master PG sends a request for a takeover procedure along with its device authentication information to Slave PG; Slave PG validating the Master PG device authentication information and informs user of such takeover procedure; user chooses to redirect takeover procedure; Slave PG sending over a redirecting message to Master PG informing it which Slave PG to communicate with for the takeover procedure; and Master PG performing the steps of the takeover procedure as described in out previous embodiment.

BRIEF DESCRIPTION OF DRAWINGS

The above and other objects and features of the invention will appear more fully hereinafter from a consideration of the following description taken in connection with the accompanying drawing wherein one example is illustrated by way of example, in which.

BEST MODE FOR CARRYING OUT THE INVENTION

To help understand the invention, the following definitions are used:

"Personal Area Network (PAN)" refers to devices forming a personal network based on security association information formed either directly or indirectly.

"Personal Network (PN)" refers to one or more PAN (s) or devices under the control of one user such that the user perceives a continuous secure connection regardless of their relative locations.

"Personal Gateway (PG)" refers to the entity within a PAN which is able to route (forward) data packets for devices within a PAN to other personal gateway(s).

"Service Advertisement" refers to messages relating to capability announcements including updates of new or removed capabilities within the Personal Network.

In the following description, for purposes of explanation, specific numbers, times, structures, protocol names, and other parameters are set forth in order to provide a thorough understanding of the present invention. However, it will be apparent to anyone skilled in the art that the presented invention may be practiced without these specific details. In other instances, well-known components and modules are shown in block diagram in order not to obscure the present invention unnecessarily.

Figure 1:
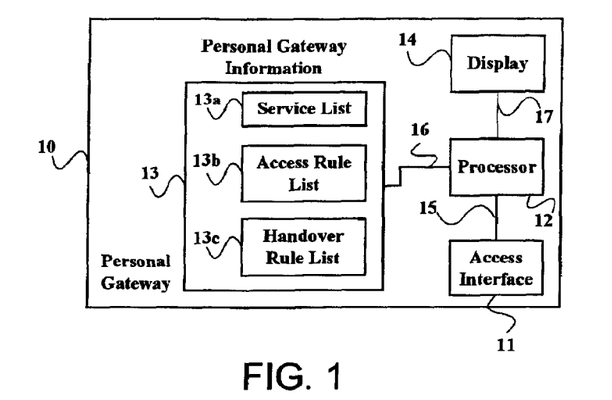
FIG. 1 is a diagram illustrating the components of the Personal Gateway according to a preferred embodiment of the current invention.

Referring to FIG. 1, the preferred components of the Personal Gateway (PG) for the current invention is disclosed. In our preferred embodiment, PG 10 comprises of access interface 11, which allows it to send or receive packets with other personal gateways and also with device(s) within the user's personal network. In our preferred embodiment, access interface 11 may be but not restricted to Wi-Fi, Bluetooth or Cellular. The packets are sent to processor 12 via path 15. In our preferred embodiment, packets may be but not restricted to service advertisement. For example, when a printer forms a PAN with a mobile gateway, the mobile gateway, acting as a Slave PG in the user's personal network, shall update the Master PG of this new capability of printing in the PAN by sending the service advertisement. When the printer is switched or its printing capability is unavailable due to some reason, the mobile gateway immediately updates the Master PG of this unavailability of printing services in the PAN by sending the service advertisement. Thus, the Master PG would be informed whenever capabilities within the personal network changes either through a service advertisement or when it detects that a Slave PG has lost its connection to the personal network.

PC 10 further comprises of PG information 13, which stores the information required by the PG 10. In our preferred embodiment, PG information 13 comprises of service list 13a, access rule list 13b and handover rule list 13c. In our preferred embodiment, service list 13a may comprise of but not restricted to all or some of the service descriptions located within the user's personal network and Internet Protocol (IP) addresses of the user's personal gateways. For example, the service list for a Master PG would comprise of all the capabilities of all devices within the personal network. In addition, the Master PG's service list would also comprise of a list of capability updates that the Slave PG within the personal network have registered for. Thus, this would allow the Master PG to use the service list during the selective updating procedure, which will be described in the later embodiments. Furthermore in our preferred embodiment, access rule list 13b may comprise of but not restricted to security policies set by the user of PN 20. These security policies will be used by PG 10 to determine how service advertisements will be sent within the user's PN 20. Furthermore in our preferred embodiment, handover rule list 13c may be but not restricted to user defined rules used by PG 10 to determine if the handover procedure is to be initiated by PG 10.

In our preferred embodiment, the service list 13a, access rule list 13b and handover rule list 13c used in the invention may be constructed in XML format. The elements for each list are not limited to the ones stated. The message may be also constructed using any other format having similar parameters for passing information.

1) Service List

```
<message id=service_list>
<service_list>
    <PG_ID> Personal Gateway Identification </PG_ID>
    < PG_addr> Personal Gateway Address </ PG_addr>
    < PG_servxxx> Personal Gateway Services </ PG_servxxx>
</service_list>
```

2) Access Rule List

```
<message id=access_list>
<access_list>
    <PN_policyxxx> Personal Network Access Policies
    </ PN_policyxxx>
</access_list>
```

3) Handover Rule List

```
<message id=handover_list>
< handover_list>
    <PN_rulexxx> Personal Network Handover Ruless </ PN_rulexxx>
</ handover_list>
```

PG 10 further comprises of processor 12, which does the processing of the service advertisements, processing of user commands and the setting up of a secure communication channels within the preferred system. In our preferred embodiment, processor 12 will check the service description stored in service list 13a to determine if a particular personal gateway would require the service advertisement. The service list according to our preferred embodiment will be sent via path 16. PG 10 further comprise of display 14, which will display user information sent from processor 12 via path 17 to the user. In our preferred embodiment, user information may be but not restricted a prompt for a user password.

Figure 2:
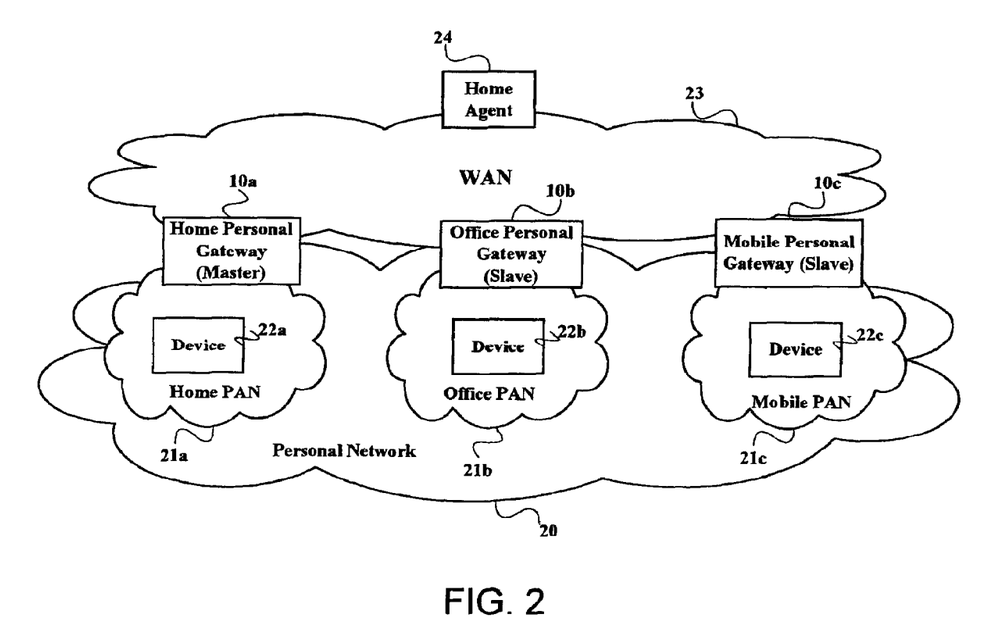
FIG. 2 is a diagram illustrating the preferred system according to a preferred embodiment of the invention.

Referring to FIG. 2, the preferred system for the current invention is disclosed. In this system, Home Agent 24 (HA) resides within the Wide Area Network 23 (WAN). HA 24 may be implemented as a Mobile IP Home Agent which would forward packets within the user's Personal Network (PN) 20. In our preferred system, a user's PN 20 comprises of Home PAN 21a, Office PAN 21b and Mobile PAN 21c. In our preferred embodiment, Home PAN 21a comprise of Home PG 10a, which functions as the master personal gateway in the user's PN 20. Home PAN 21a further comprise of device 22a, which advertises its service(s) within Home PAN 21a.

In our preferred embodiment, office PAN 21b comprise of Office PG 10b, which functions as a slave personal gateway in the user's PN 20. Office PAN 21b further comprise of device 22b, which advertises its service(s) within office PAN 21b. In our preferred embodiment, Mobile PAN 21c comprise of Mobile PG 10c, which functions as a slave personal gateway in the user's PN 20. Mobile PAN 21c further comprise of device 22c, which advertises its service(s) within Mobile PAN 21c.

In our preferred system, Home PG 10a, Office PG 10b and Mobile PG 10c are similar to PG 10 as described in FIG. 1. Furthermore, in our preferred system, Home PG 10a, Office PG 10b and Mobile PG 10c will aggregate all the services within their respective network and stored it as a service list in it data storage 13. Home PG 10a, Office PG 10b and Mobile PG 10c will then able to update each other on the services within PN 20 by routing service advertisements amongst each other via HA 24.

In our preferred system, device 22a, 22b, 22c maybe but not restricted to personal gateway, personal computer or other electronic peripherals. Furthermore, in our preferred system, device 22a, 22b, 22c are able to advertise their service(s) using techniques such as but not restricted to Universal Plug and Play (UPnP) or Service Discovery Protocol (SDP). Furthermore, in our preferred system, PG 10a, 10b, are implemented as fixed personal gateways and PG 10c is implemented as a mobile personal gateway. However it will be apparent to those skilled in the art, personal gateways within PN 20 may be implemented fixed or mobile gateways.

Furthermore, in our preferred system, Slave PGs are able to identify the Master PG within PN 20.

In our preferred system, the method of Slave PG identifying the Master PG may be but not limited to the user assigning a unique identifier for the Master PG.

Although in this system, it is illustrated that PN 20 comprises of Home PAN 21a, Office PAN 21b and Mobile PAN 21c, it will be apparent to those skilled in the art, PN 20 may comprise of one or a plurality of user's PAN. Furthermore, in this system, it is illustrated that a PAN comprises of a device. However it will be apparent to those skilled in the art, a PAN may comprise of a plurality of devices. Furthermore, in this system, it is illustrated that HA 24 is not part of PN 20. However, it will be apparent to those skilled in the art, HA 24 may be part of PN 20. Furthermore, in our preferred system, within PN 20, Home PG 10a functions as the master personal gateway and Office PG 10b and Mobile PG 10c function as slave personal gateway. However it will be apparent to those skilled in the art, the role of master maybe assigned to any one of the personal gateways within PN 20. Furthermore, it will be apparent to those skilled in the art, the role of slave maybe assigned to any of the personal gateways within PN 20.

When Mobile PG 10c is within the Home PAN, it can be reachable via its Home Address (HoA). When it roams within WAN 23, it may use techniques such as but not restricted to Mobile IPv6 to allow it to be reachable even while roaming across WAN 23. Therefore, this allows a user's PAN or devices within PN 20 to be located geographically apart. Mobile PG 10c obtains a local Care-of Address (CoA) and updates HA 24 of it using technique such as but not restricted to Return Routability (RR) procedure. HA 24 will then bind Mobile PG 13c HoA with the CoA it was provided in the RR procedure. This would then allow Mobile PG 10c to maintain its communication link with Home PG 10a and Office PG 10b via HA 24.

With the communication link establish between Mobile PG 10c and Home PG 10a, Mobile PG 10c proceeds to inform Home PG 10a about service capabilities within PN 20 that Mobile PG 10c is interested in receiving. For example, Mobile PG 10c sends a message asking Home PG 10a to forward any service advertisements to Mobile PG 10c regarding changes in printing capabilities within PN 20. Home PG 10a stores these service advertisement requests within its service list. When Home PG 10a receives a service advertisement, Home PG 10a checks its service list to determine which Slave PG(s) have requested for capability update for the received service advertisement. Once identified, Home PG 10a would perform the method of selective updating by forwarding the received service advertisement to selected Slave PG(s).

Figure 3:
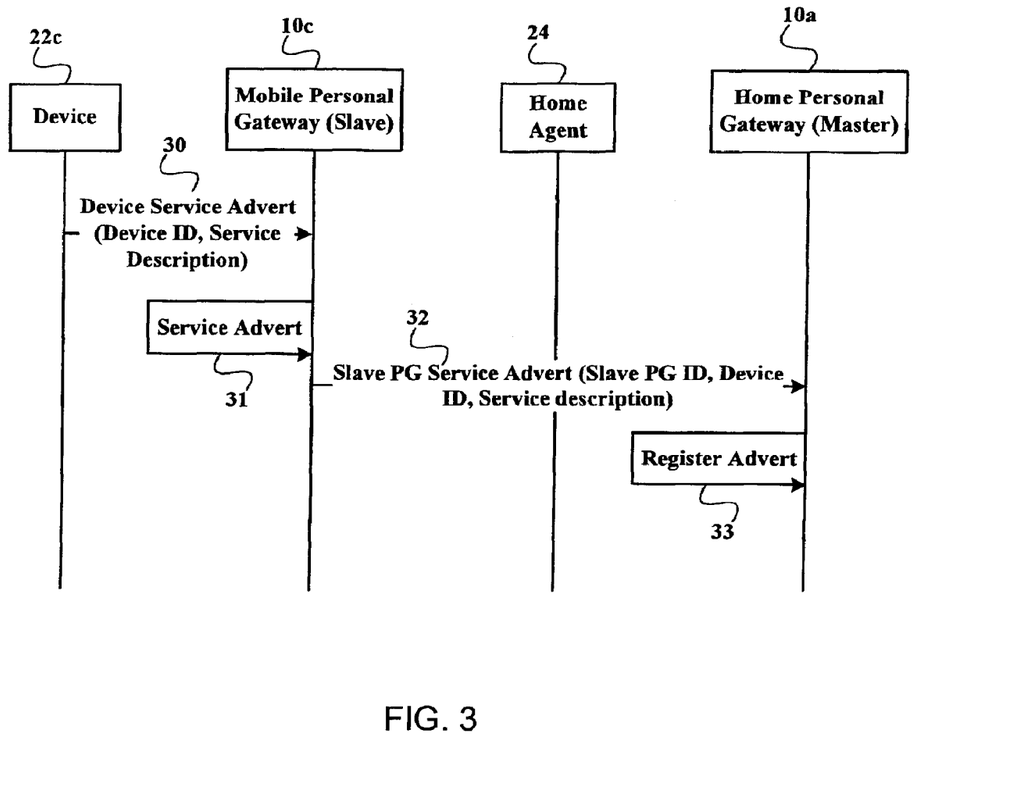
FIG. 3 is a sequence diagram illustrating on the preferred method of forwarding service advertisement from Slave Personal Gateways) to Master Gateway according to a preferred embodiment of the invention.

Referring to FIG. 3, the sequence diagram illustrating on the preferred method of forwarding service advertisement from Slave Personal Gateway(s) to Master Gateway according to a preferred embodiment of the invention is disclosed. In our preferred embodiment, device 22c broadcast its service advertisement in step 30 within Mobile PAN 21c. In this preferred embodiment, device service advertisement may comprise of but not restricted to device identification and service description. Once Mobile PG 10c receives the service advertisement from device 22c, it will perform the step of service advertisement 31. In our preferred embodiment, the step of service advertisement 31 comprises of updating its service list 13a stored within Mobile PG 10c accordingly to device 22c service advertisement. Mobile PG 10c will then create a Slave PG service advertisement and forward it via HA 24 to Home PG 10*a* in step 32. In this preferred embodiment, Slave PG service advertisement may comprise of but not restricted to Slave PG identification, device identification(s) and service description(s). Home PG 10*a* upon receiving Slave PG service advertisement will identify which Slave PG sent the service advertisement from the Slave PG identification within the Slave PG service advertisement 31. Home PG 10*a* would then proceed to perform the step of register advertisement 33.

In our preferred embodiment, the step of register advertisement 33 comprises of up dating its service list 13*a* stored within Home PG 10*a* accordingly to Slave PG service advertisement and Home PG 10*a* performing the selective update procedure. In our preferred embodiment, the selective update procedure is a function that the Master PG will perform to choose which PAN to send the service advertisement to. The Master PG has the role of a central management entity within PN 20. In this embodiment, Master PG can act like a Personal Network Management entity. An exemplary function describing this embodiment is disclosed later.

Figure 4:
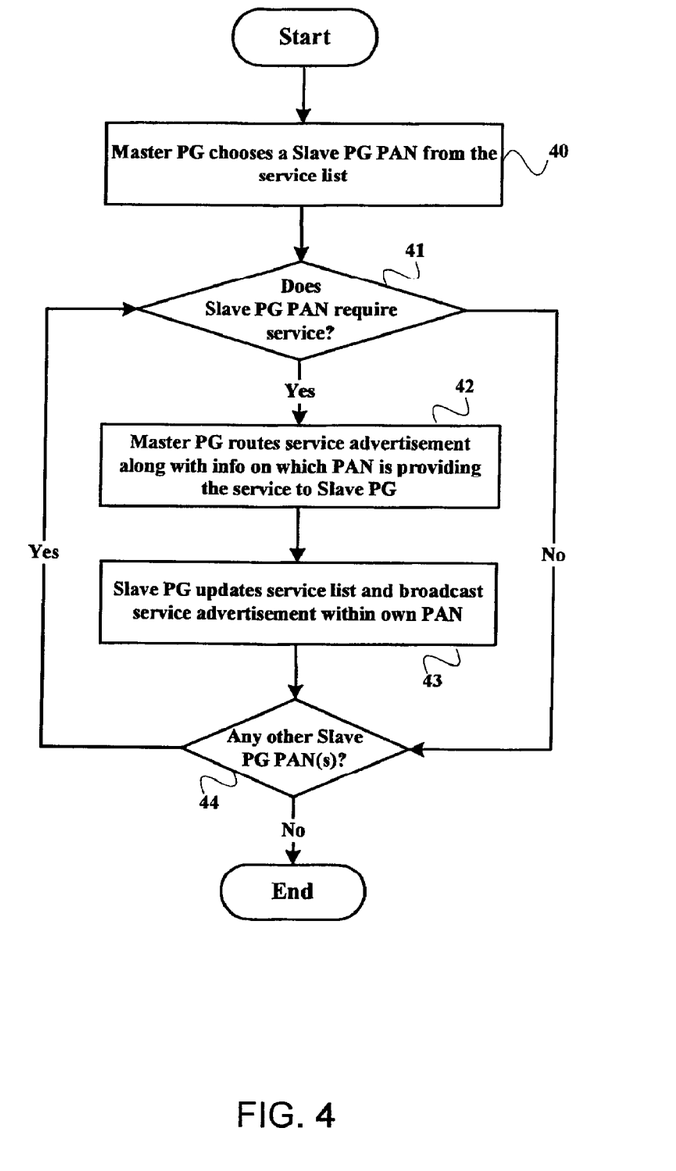
FIG. 4 is a flow chart illustrating on a service based method of the selective updating procedure performed by the Master Personal Gateway according to a preferred embodiment of the invention.

Referring to FIG. 4, the flow chart illustrating the method of the selective updating procedure performed by the Master Personal Gateway according to a preferred embodiment of the invention is disclosed. In our preferred embodiment, after Master PG has update its service list 13*a* with the service advertisement received from Slave PG, it then chooses a Slave PG PAN from its service list 13*a* in step 40. In our preferred embodiment, the Master PG will then determine if the particular Slave PG PAN requires the service provided in step 41. In our preferred embodiment, the process of Master PG determining if Slave PG will need to receive the service advertisement may be but not restricted to the Master PG using the service description in the Slave PG service advertisement stored in its service list 13*a* to determine if the Slave PG PAN has the capabilities to use the service advertised. Such determination can be for the Master PG to check from the Master PG service list if the Slave PG has requested for updates regarding capability change of a particular services in the user's personal network.

In our preferred embodiment, if the Slave PG PAN requires the service provided, Master PG will then forward the Slave PG service advertisement over to the selected Slave PG in step 42. In our preferred embodiment, when the Slave PG receives the service advertisement from the Master PG, it will then update the service within its service list 13*a* in step 43. Furthermore, in our preferred embodiment, the Slave PG will then broadcast the service advertisement within its PAN. In our preferred embodiment, after the Master PG has decided whether to route the service advertisement to a particular Slave PG, it will repeat steps 41, 42 and 43 until all Slave PG(s) has been considered for service updating in step 44.

Figure 5:
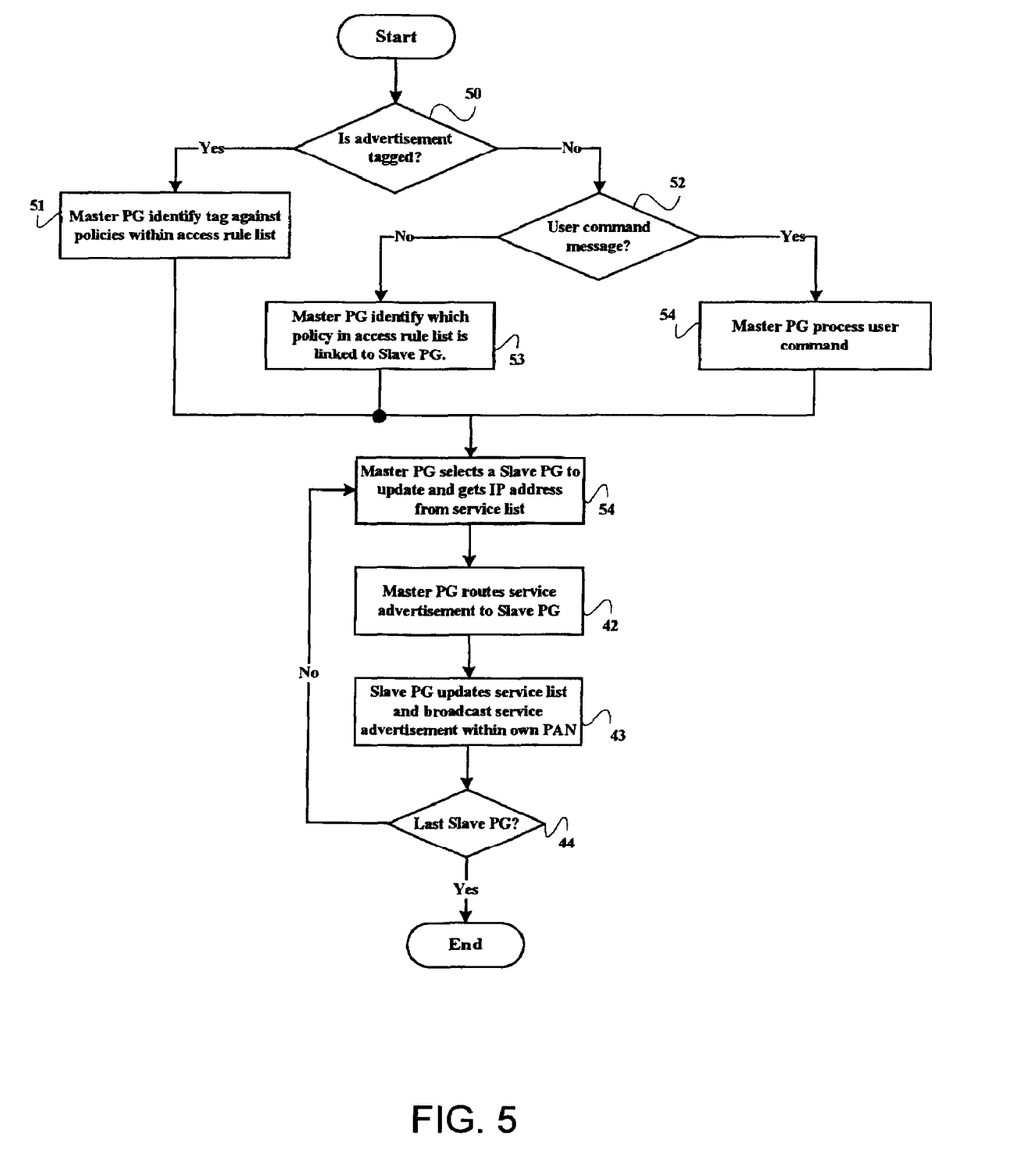
FIG. 5 is a flowchart illustrating on another method of the selective updating procedure performed by the Master Personal Gateway according to a preferred embodiment of the invention.

In a second embodiment of selective updating procedure in our invention, there exists another method to allow for the selective updating procedure by the Master PG to one or a plurality of selected slave PGs. FIG. 5 shows a flow chart illustrating on another method of the selective updating procedure performed by the Master Personal Gateway according to a second embodiment of the invention. In this embodiment, the method of selective updating procedure comprises of forwarding service advertisements based on processing a tagged service advertisement against the policies set within access rule list 13*b*. In this embodiment, according to FIG. 3, when Mobile PG 10*c* receives device service advertisement in step 30 and updates its service list 13*a*, Mobile PG 10*c* will tag the advertisement based on the policies set within the access rule list 13*b* in step 31. Mobile PG 10*c* will then send the tagged Slave PG service advertisement in step 32 to Home PG 10*a*. In this embodiment, tagging may be but not restricted to adding a flag bit to the Slave PG service advertisement.

When Home PG 10*a* receives Slave PG service advertisement 32 from Mobile PG 10*c*, it checks to determine if the service advertisement is tagged is step 50. In this embodiment, when the Home PG 10*a* receives the tagged service advertisement, it identifies the tag to determine which policy to use from access rule list 13*b* in step 51. The selected policy will allow the Home PG 10*a* to know which Slave PG the service advertisement will be forwarded to. In this embodiment, once Home PG 10*a* identifies one or a plurality of Slave PGs to inform, it selects a first Slave PG from access list 13*b* and gets the IP address of the selected Slave PG from its service list 13*a* in step 54. Home PG 10*a* then forwards the service advertisement to the selected Slave PG in step 42 as described in FIG. 4. The selected Slave PG will update its service list 13*a* and broadcast the service advertisement within its PAN in step 43 as described in FIG. 4. In this embodiment, Home PG 10*a* will continue to route the service advertisement to any remaining Slave PGs within the selected policy until all Slave PGs within the policy has been informed in step 44 as described in FIG. 4.

Furthermore, in this embodiment, another method of selective updating procedure comprises of forwarding service advertisements based on command sent by the user.

In this embodiment, when Home PG 10*a* receives the service advertisement, it checks to determine if the service advertisement is tagged is step 50. In this embodiment, once Home PG 10*a* identifies that Slave PG service advertisement 32 is not tagged, it checks if a user command has been sent along with Slave PG service advertisement 32 in step 52.

In this embodiment, according to FIG. 3, when Mobile PG 10*c* sends the Slave PG service advertisement to Home PG 10*a* in step 32, it will further send a command to Home PG 10*a* to inform it of one or a plurality of Slave PGs to forward the service advertisement to. In this embodiment, command may be but not restricted to user level command specifying information on which Slave PG that the Master PG will forward the service advertisement to.

When Home PG 10*a* receives a user command from Mobile PG 10*c*, it processes the user command that was sent along with the Slave PG service advertisement using processor 12 in step 54. Once the user command has been processed, Home PG 10*a* will know which Slave PG will be informed of the service advertisement. In this embodiment, user command comprises of a Slave PG information. However it will be apparent to those skilled in the art would appreciate that user command may comprise of a plurality of Slave PGs information. Once the user command have been processed, Home PG 10*a* then selects a Slave PG based on the user command and gets the IP address from its service list 13*a* in step 54. Home PG 10*a* then forward the service advertisement to the selected Slave PG in step 42 as described in FIG. 4. The selected Slave PG will update its service list 13*a* and broadcast the service advertisement within its PAN in step 43 as described in FIG. 4. In this embodiment, Home PG 10*a* will continue to route the service advertisement to any remaining Slave PGs within the selected policy until all Slave PGs specified within the user command has been informed in step 44.

Furthermore, in this embodiment, another method of selective updating procedure comprises of forwarding service advertisements based on the policies set within access rule list 13*b*. In this embodiment, when Home PG 10*a* receives the service advertisement, it determines that the Slave PG service advertisement 32 is not tagged in step 50, Furthermore, Home PG 10a also determine that no command has been sent along with Slave PG service advertisement 32 in step 52. In this embodiment, Home PG 10a then identifies which policy within its access rule list 13b will be enforced based on which Slave PG identification within Slave PG service advertisement 32 in step 53. In this embodiment, once Home PG 10a identifies one or a plurality of Slave PGs to inform within the selected policy, it selects a first Slave PG from access list 13b and gets the IP address of the selected Slave PG from its service list 13a in step 54. Home PG 10a then forwards the service advertisement to the selected Slave PG in step 42 as described in FIG. 4. The selected Slave PG will update its service list 13a and broadcast the service advertisement within its PAN in step 43 as described in FIG. 4. In this embodiment, Home PG 10a will continue to route the service advertisement to any remaining Slave PGs within the selected policy until all Slave PGs within the policy has been informed in step 44 as described in FIG. 4.

In a third embodiment of selective updating procedure in our invention, there exists a method to allow a Slave PG to perform a lookup at Master PG for a particular service. In this embodiment, according to FIG. 3, Home PG 10a stores the service advertisement it receives from Slave PG(s) in its service list 13a. In this embodiment, when any Slave PG within PN 20 receives a service request from devices, it performs a service lookup to Home PG 10a. In this embodiment, service lookup may be but not restricted to UPnP service request. Home PG 10a will then determine from its service list 13a if the requested service is available. In this embodiment, if the particular requested service is available, Home PG 10a will then forward the service advertisement to Slave PG.

Figure 6:
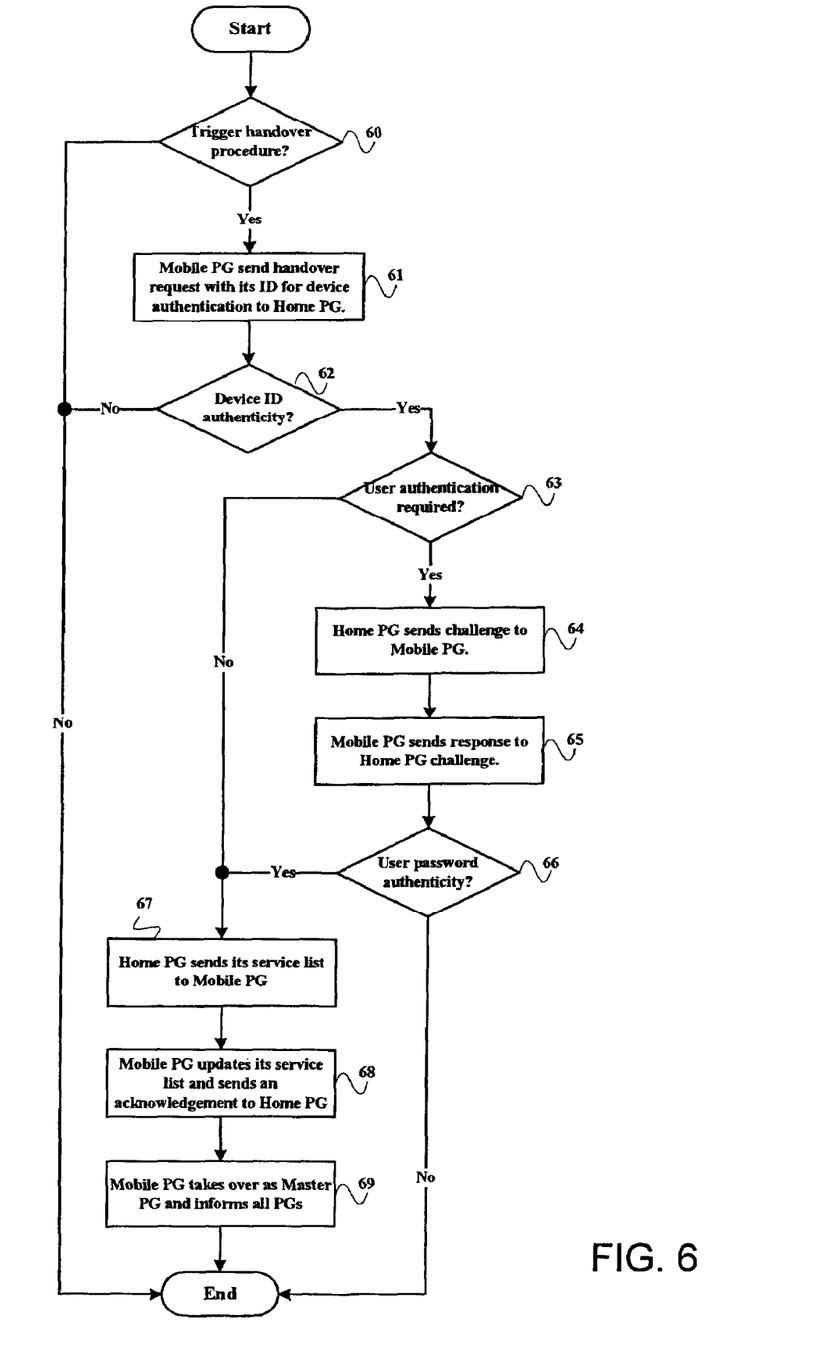
FIG. 6 is a flow chart illustrating on a method of Master Personal Gateway and Slave Personal Gateway performing the handing over procedure according to a preferred embodiment of the invention.

In our preferred system, there exist a method for Master PG to handover its duties to a Slave PG for it to function as the new Master PG within PN 20. In our preferred system, Mobile PG 10c roams back into Home PAN 21a and decides to take over the role as the Master PG within PN 20. Referring to FIG. 6, a flow chart illustrating a method of Master Personal Gateway and Slave Personal Gateway performing the handing over procedure according to a preferred embodiment of the invention is disclosed. In this embodiment, Home PG 10a and Mobile PG 10c are able to form a secure communication channel. When Mobile PG 10c roams back into Home PAN 21a, it checks to determine if a handover procedure is required to be triggered in step 60. In this embodiment, the method of Mobile PG 10c triggering the handover procedure is that the sending of a user command from Mobile PG 10c to Home PG 10a. Furthermore, another method of Mobile PG 10c triggering the handover procedure is that Mobile PG 10c checking its rules within handover rule list 13c to determine if a handover procedure is necessary. If a handover procedure is not required, then Mobile PG 10c and Home PG 10a will continue to assume their roles as Slave PG and Master PG respectively.

In this embodiment, once Mobile PG 10c determines that a handover procedure is necessary, it sends a request for the handover procedure containing its device authentication information to Home PG 10a in step 61. In our preferred embodiment, the device authentication information may comprise but not restricted to Mobile PG 10c device identification and a shared key. Home PG 10a will then process the device authentication to determine the authenticity in step 62. If Home PG 10a is unable to validate the authenticity of Mobile PG 10c device authentication information, it terminates the handover procedure by informing Mobile PG 10c that it has failed its device authentication phase. In this embodiment, when Home PG 10a has performed the device authentication phase with Mobile PG 10c, Home PG 10a will check if a user authentication phase is required for the handover procedure in step 63. If a user authentication phase is not required in step 63, Home PG 10a then sends it service list 13a to Mobile PG 10c in step 67. In this embodiment, once Mobile PG 10c receives Home PG 10a service list 13a, it updates its PG Information 13 with Home PG boa service list 13a and sends an acknowledgment back to Home PG 10a in step 68.

If a user authentication phase is required in step 63, Home PG 10a sends a challenge message to Mobile PG 10c requesting for a password in step 64. In this embodiment, password may be but not restricted to a Personal Identification Number (PIN). Mobile PG 10c will then prompt the user to input a password via display 14. In this embodiment, when the user input the password via display 14, Mobile PG 10c will send the password to Home PG 10a via the secure communication channel in step 65. In this embodiment, Home PG 10a will then validate the authenticity of the password in step 66. If Home PG 10a is unable to validate the authenticity of Mobile PG 10c password, it terminates the handover procedure by informing Mobile PG 10c that it has failed its user authentication phase. In this embodiment, once Home PG 10a is able to validate Mobile PG 10c password, Home PG 10a then sends it service list 13a to Mobile PG 10c in step 67. In this embodiment, once Mobile PG 10c receives Home PG 1a service list 13a, it updates its PG Information 13 with Home PG 10a service list 13a and sends an acknowledgment back to Home PG 10a in step 68.

In this embodiment, after Mobile PG 10c sends the acknowledgement to Home PC 10a in step 68, Mobile PG 10c becomes the new Master PG and Home PG 10a becomes a Slave PG within PN 20. The new Master PG informs all PGs within PN 20 of its presence in step 69. In this embodiment, the method of the new Master PG informing all PGs within PN 20 of its presence refers to the new Master PG multicasting an update message to all Slave PGs within PN 20 via HA 24. This update message informs Slave PGs on how they are able to communicate with the new Master PG. In this embodiment, update message may comprise of but not restricted to the new Master PG Identification and IP address.

Furthermore in this embodiment, the method of the new Master PG informing all PGs within PN 20 of its presence refers to the new Master PG sending an HA update message to HA 24 informing it of its role as Master PG within PN 20.

In this embodiment, the HA update message may comprise of but not restricted to the new Master PG Identification and IP address. In this embodiment, HA 24 would then bind the new Master PG IP address as the default address for routing of service advertisements from one or a plurality of Slave PGs.

Figure 7:
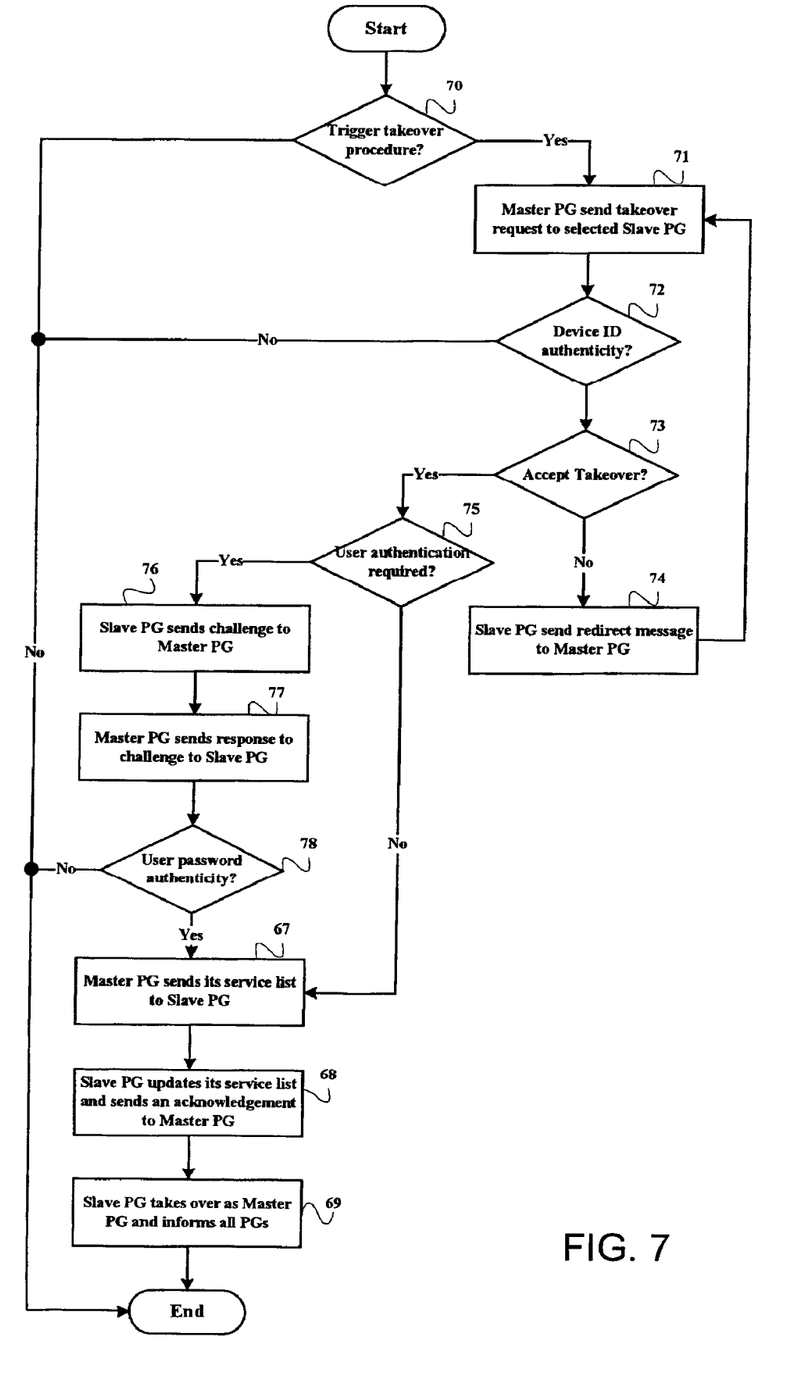
FIG. 7 is a flow chart illustrating on a method of Master Personal Gateway and Slave Personal Gateway performing the taking over procedure according to a preferred embodiment of the invention.

In our preferred system, there exists a method for Master PG to request a Slave PG to takeover its duties as the new Master PG within PN 20. FIG. 7 shows a flow chart illustrating on a method of Master Personal Gateway and Slave Personal Gateway performing the taking over procedure according to a preferred embodiment of the invention. In this embodiment, Master PG and Slave PG are able to form a secure communication channel. Master PG checks to determine if a takeover procedure is required to be triggered in step 70. In this embodiment, the reason of Master PG triggering the handover procedure maybe but not restricted to impending network interface failure at Master PG.

If a takeover procedure is not required, then Master PG and Slave PG will continue to assume their roles with PN 20. In this embodiment, once Master PG determines that a takeover procedure is necessary, it will send a takeover request containing its device authentication information to initiate a takeover procedure with the selected Slave PG in step 71.

In this embodiment, the device authentication information may comprise but not restricted to Master PG device identification and a shared key. When the selected Slave PG receives the takeover request form Master PG, it validates the authenticity of Master PG device authentication information. If the selected Slave PG is unable to validate the authenticity of Master PG device authentication information, it terminates the takeover procedure by informing Master PG that it has failed its device authentication phase.

In this embodiment, when the selected Slave PG has performed the device authentication phase with the Master PG, the selected Slave PG will then determine if it has the capabilities to take over the role of Master PG in step 73. In this embodiment, the method of Slave PG determining if it has the capabilities to take over the role of Master PG maybe but not restricted to displaying to the user that a takeover procedure is about to be executed via display 14 and getting a user decision to proceed with the takeover procedure.

If the user chooses not to accept the takeover request from Master PG in step 73, it informs the selected Slave PG to send a redirect message containing another Slave PG information to Master PG in step 74. In this embodiment, the reason that a user would choose to redirect the handover procedure may be but not restricted to that the user feels that the selected Slave PG does not have the necessary internal resources to function as the role of Master PG. In this embodiment, internal resources may be but not restricted to memory capacity or battery lifetime. Master PG will then communicate with Slave PG that was specified in the redirect message to perform the takeover procedure. If the user chooses to accept the takeover request in step 73, the selected Slave PG will check if a user authentication phase is required for the takeover procedure in step 75. In this embodiment, if a user authentication phase is not required in step 75, Master PG then sends it service list 13a to the selected Slave PG in step 67 as described in FIG. 6. In this embodiment, once the selected Slave PG receives Master PG service list 13a, it updates its PG Information 13 with Master PG service list 13a and sends an acknowledgment back to Master PG in step 68 as described in FIG. 6.

If a user authentication phase is required in step 75, the selected Slave PG sends a challenge message to Master PG requesting for a password in step 76. In this embodiment, password may be but not restricted to a Personal Identification Number (PIN). Master PG will then send the password to the selected Slave PG via the secure communication channel in step 77. In this embodiment, the selected Slave PG will then validate the authenticity of the password in step 78. If the selected Slave PG is unable to validate the authenticity of Master PG password, it terminates the takeover procedure by informing Master PG that it has failed its user authentication phase.

In this embodiment, once the selected Slave PG is able to validate Master PG password, Master PG then sends it service list 13a to the selected Slave PG in step 67 as described in FIG. 6. In this embodiment, once the selected Slave PG receives Master PG service list 13a, the selected Slave PG updates its PG Information 13 with Master PG service list 13a and sends an acknowledgment back to Master PG in step 68 as described in FIG. 6.

In this embodiment, after the selected Slave PG sends the acknowledgment to the Master PG in step 68, the Master PG becomes the Slave PG and the selected Slave PG becomes the new Master PG within PN 20. In this embodiment, the new Master PG informs all PGs within PN 20 of its presence in step 69 as described in FIG. 6.

Figure 8:
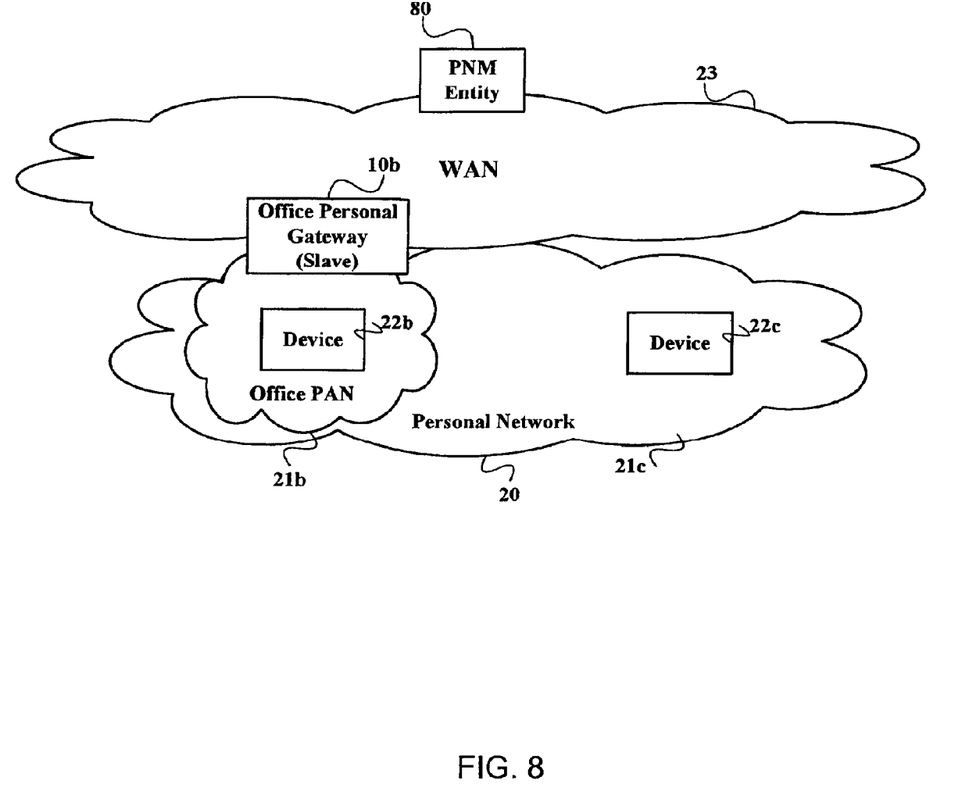
FIG. 8 is a diagram illustrating on a method of Master Personal Gateway acting as the Personal Network Management entity according to a preferred embodiment of the invention.

In yet another embodiment, there exists a method for Master PG being a Personal Network Management (PNM) entity within PN 20. FIG. 8 illustrates on a method of Master Personal Gateway acting as the Personal Network Management entity according to a preferred embodiment of the invention. In this embodiment, PNM entity 80 has the role of Master PG and manages PN 20 by serving as a central entity the slave PGs. Furthermore, in this embodiment, PNM entity 80 contains a service list of all the services provided in each PAN in PN 20. Slave PGs within PN 20 will send their service advertisements to PNM entity 80. An example is that a printer, device 22b, has just established a connection within Office Slave PG 10b and advertises its services within Office PAN 21b. Office Slave PG 10b updates its service list with the printer's new service and sends the service advertisement to PNM entity 80 by performing the steps as described in FIG. 3. When PNM entity 80 receives a service advertisement, it updates its service list. In this embodiment, PNM entity 80 determines if personal computer, device 22c, is required to receive the service capability update. If so, PNM entity 80 performs the steps of selective updating as described in FIG. 4 to inform the personal computer of new services within PN 20.

Although the invention has been herein shown and described in what is conceived to be the most practical and preferred embodiment, it will be appreciated by those skilled in the art that various modifications may be made in details of design and parameters without departing from the scope and ambit of the invention.

This application is based on International Patent Application No. PCT/JP06/301945 filed on Jan. 31, 2006, and the U.S. Provisional Application No. 60/792,630 filed on Apr. 13, 2006, entire content of which is expressly incorporated by reference herein.

The invention claimed is:

1. A method for communicating between a Master Personal Gateway (Master PG) and a plurality of Slave Personal Gateways (Slave PGs), the method comprising:
   providing a plurality of Slave PG service lists from the plurality of Slave PGs to the Master PG, at least one first Slave PG service list describing one or more services provided by at least one Slave PG that provides the at least one first Slave PG service list, and at least one second Slave PG service list describing one or more services for which at least one Slave PG that provides the at least one second Slave PG service list is interested in receiving updates;
   storing the plurality of Slave PG service lists at the Master PG in a Master PG service list;
   receiving at the Master PG a service advertisement of a service described in the Master PG service list from a Slave PG that provides that service;
   selecting at the Master PG one or more Slave PGs that are interested in receiving updates for the service advertised in the service advertisement; and
   forwarding the service advertisement from the Master PG to the selected one or more Slave PGs.

2. The method of claim 1, wherein the step of selecting comprises the Master PG checking in the Master PG service list if each of the plurality of Slave PGs that has provided the plurality of Slave PG service lists has requested a capabilities update of the service specified in the service advertisement.

3. The method of claim 1, further comprising the steps of:
   tagging the service advertisement at the Slave PG that provides the service according to access rules of the Slave PG;

forwarding the tagged service advertisement from the Slave PG to the Master PG; and processing the tagged service advertisement at the Master PG based on stored access rules within the Master PG.

4. The method of claim 1, further comprising:

identifying at the Master PG a sender of the service advertisement based on an identification.

5. The method of claim 1, further comprising:

sending a service advertisement along with a user command from the Slave PG to the Master PG; and processing at the Master PG the user command.

6. The method of claim 1, further comprising:

storing at the Master PG all service advertisements received from the plurality of Slave PGs within a data store of the Master PG; and performing a service lookup at the Master PG whenever any one of the plurality of Slave PGs receives a service request.

7. The method of claim 1, wherein the Master PG is configured to function as a Personal Network Management (PNM) server.

8. The method of claim 1, wherein each of the selected one or more Slave PGs is configured to receive the service advertisement.

9. The method of claim 1, wherein the step of selecting comprises determining at least one capability of each of at least one Slave PG based on the Slave PG service list received from the at least one Slave PG.

10. The method of claim 4, wherein the identification is a Slave PG identification.

11. The method of claim 8, wherein the selected one or more Slave PGs are not in a Personal Area Network (PAN).

12. The method of claim 1, wherein the selected one or more Slave PGs, to which the service advertisement is forwarded, are different Slave PG(s) than the Slave PG, from which the service advertisement is received.

13. A Master Personal Gateway (Master PG) configured to communicate with a plurality of Slave Personal Gateways (Slave PGs), comprising:

a service list receiving section configured to receive a plurality of Slave PG service lists from the plurality of Slav PGs, at least one first Slave PG service list describing one or more services provided by at least one Slave PG that provides the at least one first Slave PG service list, and at least one second Slave PG service list describing one or more services for which at least one Slave PG that provides the at least one second Slave PG service list is interested in receiving updates;

a storing section configured to store the plurality of Slave PG service lists in a Master PG service list;

a receiving section configured to receive a service advertisement of a service described in the Master PG service list from a Slave PG that provides that service;

a selecting section configured to select one or more Slave PGs that are interested in receiving updates for the service advertised in the service advertisement; and a forwarding section configured to forward the service advertisement to the selected one or more Slave PGs.

* * * * *